United States Patent
Bellmann et al.

(10) Patent No.: US 11,441,901 B2
(45) Date of Patent: Sep. 13, 2022

(54) OPTICAL SURVEYING INSTRUMENT

(71) Applicant: Trimble Jena GmbH, Jena (DE)

(72) Inventors: Richard Bellmann, Weimar (DE); Ronny Klinghammer, Hermstedt (DE); Andreas Frank, Elgersburg (DE)

(73) Assignee: Trimble Jena GmbH, Jenga (DE)

( * ) Notice: Subject to any disclaimer, the term of this patent is extended or adjusted under 35 U.S.C. 154(b) by 0 days.

(21) Appl. No.: 17/086,759

(22) Filed: Nov. 2, 2020

(65) Prior Publication Data
US 2021/0140766 A1    May 13, 2021

(30) Foreign Application Priority Data

Nov. 8, 2019   (EP) .................................... 19208007

(51) Int. Cl.
*G01C 15/06* (2006.01)
*G06T 7/521* (2017.01)
(Continued)

(52) U.S. Cl.
CPC .............. *G01C 15/06* (2013.01); *G06T 7/248* (2017.01); *G06T 7/521* (2017.01); *G06T 7/60* (2013.01);
(Continued)

(58) Field of Classification Search
CPC ...... G01C 15/06; G02B 23/00; G06K 9/3241; G06K 9/4661; G06T 2207/10028;
(Continued)

(56) References Cited

U.S. PATENT DOCUMENTS 10,262,435 B2 * 4/2019 Yanobe .................. G01C 11/02
2016/0216109 A1   7/2016 Kumagai et al.

FOREIGN PATENT DOCUMENTS

EP    2141450 A1 *  1/2010  .............. E02F 3/847
EP    3495771 A1 *  6/2019  ........... G01B 21/047
EP    3591336 A1 *  1/2020  .............. G01S 17/42

OTHER PUBLICATIONS

Extended European Search Report for Application No. 19208007.5-1001, dated Aug. 27, 2020, 12 pages.

* cited by examiner

*Primary Examiner* — Dakshesh D Parikh
(74) *Attorney, Agent, or Firm* — Kilpatrick Townsend & Stockton LLP

(57) ABSTRACT

The invention relates to optical surveying such as in building construction, road construction, landscaping and similar. A first image sensor obtains in a first wavelength range a first image of a scene within a field of view captured by an optical arrangement such as a telescope. A light emitter emits light in a second wavelength range and a second image sensor obtains a second image of the field of view in the second wavelength range. A target position of a reflecting target is found in the first image by detecting a known image pattern of the reflecting target in the first image. A region of interest in the second image is then a defined based on the identified target position in the first image, for detecting a reflector position of a reflector of the reflecting target in the region of interest. With the invention it becomes possible to improve the identification of a reflective target at reduced processing time, even if reflections from other objects than the reflective target are present.

15 Claims, 8 Drawing Sheets

(51) Int. Cl.
*G06T 7/73* (2017.01)
*G06T 7/246* (2017.01)
*G06T 7/60* (2017.01)
*H04N 5/225* (2006.01)
*G06V 10/60* (2022.01)
*G06V 10/20* (2022.01)
*G02B 23/00* (2006.01)

(52) U.S. Cl.
CPC .............. *G06T 7/73* (2017.01); *G06V 10/255* (2022.01); *G06V 10/60* (2022.01); *H04N 5/2258* (2013.01); *G02B 23/00* (2013.01); *G06T 2207/10028* (2013.01); *G06T 2207/10048* (2013.01); *G06T 2207/20084* (2013.01); *G06T 2207/30204* (2013.01)

(58) Field of Classification Search
CPC . G06T 2207/10048; G06T 2207/20084; G06T 2207/30204; G06T 7/248; G06T 7/521; G06T 7/60; G06T 7/73; H04N 5/2258
See application file for complete search history.

OPTICAL SURVEYING INSTRUMENT

CROSS-REFERENCE TO RELATED APPLICATIONS

The present application claims priority to EP Application No. 19 208 007.5, filed Nov. 8, 2019, the contents of which are incorporated herein by reference in their entirety for all purposes.

TECHNICAL BACKGROUND

The present invention relates to optical surveying. More specifically, the invention relates to optical surveying such as in building construction, road construction, landscaping and similar.

Optical surveying applications include measurements of positions of one or multiple markers in the field, including angles, elevations and distances of the markers relative to a surveying instrument. In a typical application an optical unit of the optical surveying instrument is aimed at a marker and the relative positional relation between the optical surveying instrument and the marker is determined. It is also possible that based on a known position of the optical surveying instrument a global position of the marker is obtained.

Optical surveying instruments may also be employed to track markers in the field, in which case a changing position of a marker relative to the optical surveying instrument due to a movement of the marker is tracked.

Optical surveying instruments need to be usable in a wide range of environments and light conditions. To improve the process of identifying the marker in the field using the optical surveying instrument, the marker may be provided with a reflective characteristic to reflect light emitted by the optical surveying instrument back, so that the marker is more easily distinguished from a background scene.

In another typical application a scene is illuminated by light in a specific wavelength range, such as infrared light, and a reflection of light in the specific wavelength range is detected at the optical surveying instrument.

However, in practical application it shows that typical environments in which optical surveying instruments are operated may not only include the marker as an intended reflector, but also other reflecting surfaces may be present, such as reflective surfaces on buildings or on street signs, road side posts, reflectors on clothing and even the personnel operating the optical surveying instrument. Accordingly, the infrared image obtained by the optical surveying instrument may not only include the desired reflections from the marker, but a potentially large number of other reflections that may make it difficult to distinguish between the marker and the unwanted reflections.

An experienced operator or automatic detection systems provided in association with the optical surveying instrument may be able to identify an approximate direction of the reflective marker and then correspondingly direct an optical unit of the optical surveying instrument towards the reflective marker, however, at larger distances or in poor lighting conditions this may become difficult even for the experienced operator.

In order to aid a detection of the reflections from the reflector and thus to locate the reflector in the field, image processing technology may be employed. For example, imaging processing software may be used to identify reflections in an infrared image of a scene. Moreover, image processing software may be used to distinguish between the reflections from the marker from other reflections of other surfaces that are not of interest. For this purpose, sophisticated algorithms may be used to process the obtained infrared images and considerable processing time is required to improve identification of the marker in the scene, if at all possible.

SUMMARY OF THE INVENTION

Accordingly, it is an object of the invention to provide for optical surveillance that is in the position to detect markers in the field with improved robustness even under unfavorable environmental conditions.

This object of the invention is solved by the subject matter of the independent claims, advantageous embodiments of the invention are disclosed in the dependent claims.

With the invention it becomes possible to improve the identification of a reflective target in the field, even if reflections from other objects than the reflective target are present. Moreover, the invention allows a reduction in processing time needed to identify a reflective target in the scene by reducing the portions of the first and/or second image to areas that with high likelihood contain the reflective marker.

DETAILED DESCRIPTION OF THE PREFERRED EMBODIMENTS

Figure 1:
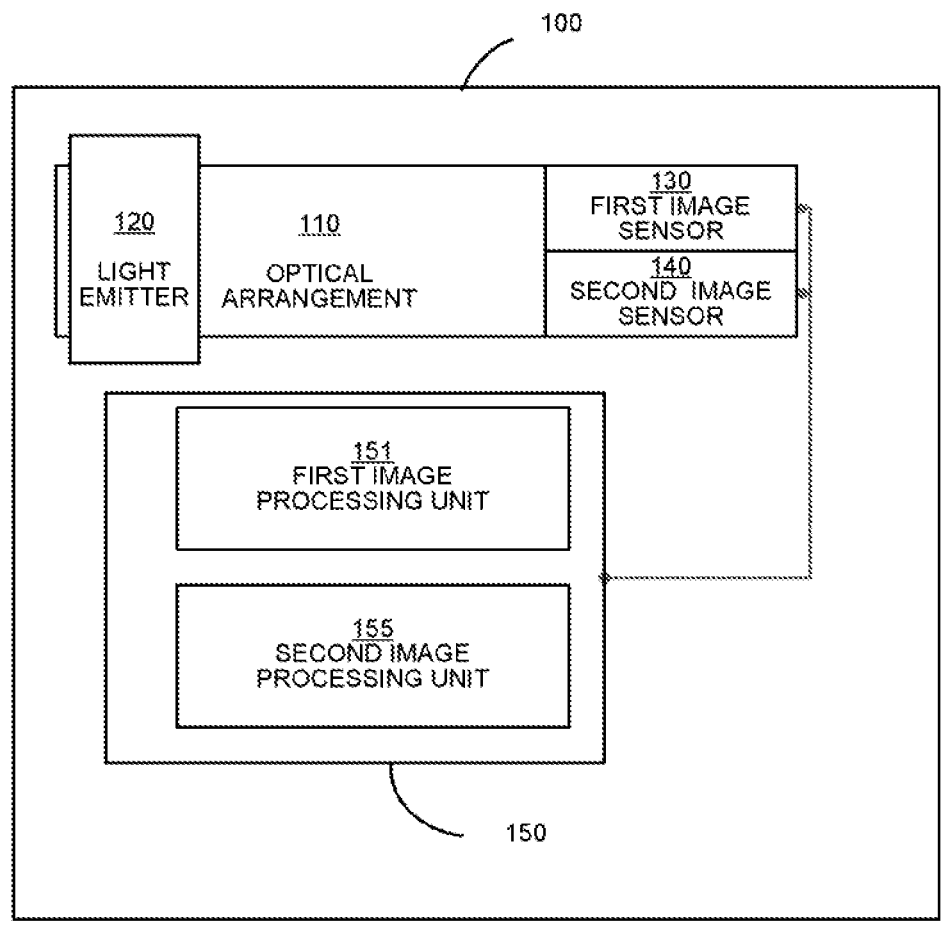
FIG. 1 shows the layout of the optical surveying instrument in accordance with an embodiment of the invention.

An embodiment of the invention is described below by making reference to FIG. 1. FIG. 1 schematically shows the layout of the optical surveying instrument in accordance with an embodiment of the invention.

The optical surveying instrument is generally designated by reference numeral 100.

The optical surveying instrument 100 includes an optical arrangement 110 defining a field of view. The field of view may be defined by the optical characteristics and dimensions of the elements of the optical arrangement. In one example the optical arrangement is a telescope including at least one lens to view a scene within the field of view defined by the characteristics of the telescope.

The optical arrangement cooperates with a first image sensor 130. The first image sensor 130 is provided to obtain a first image of the field of view in a first wavelength range, which may be a scene present in the field of view. For example, the first wavelength range may be a range of at least a part of the visual wavelength range of light visible to the human eye. However, the first wavelength range is not limited to visible light, any other wavelength range may be employed.

A light emitter 120 is provided to illuminate the scene towards field of view of the optical arrangement 110 with light in a second wavelength range. For example, the light in the second wavelength range is infrared light, however, the light emitter is not limited thereto, light within any other second wavelength range may be employed.

The optical arrangement further cooperates with a second image sensor 140. The second image sensor 140 is provided to obtain, in the second wavelength range, a second image of the field of view, which may be a scene present in the field of view.

A processing unit 150 is provided, including a first image processing unit 151 for identifying a position of a reflecting target in the first image by detecting a known image pattern of the reflecting target in the first image. The first image preferably is a digital image consisting of a plurality of pixels such as of pixels in a rectangular arrangement.

For example, the reflecting target may be positioned in a scene within the field of view of the optical arrangement 110 and the first image processing unit processes the first image captured by the first image sensor 130 to identify the reflecting target within the image. The known image pattern thereby may be a representation of the reflecting target in the first image, for example a distinct shape visible in the first image. This may be a projection of the shape generated by reflective target in the first image, wherein values of pixels in the first image belonging to the reflecting target may be identifiable based on distinct brightness values, colour values and similar.

A second image processing unit 155 is provided for defining a region of interest in the second image based on the identified target position in the first image. The region of interest in the second image may be a certain portion of the second image such as a rectangular part, a circular part, or a partition of any other shape of the second image determined surrounding a position of the reflecting target in the second image corresponding to the identified target position of the reflecting target in the first image. In other examples, however, the region of interest may also encompass the entire second image.

Moreover, the second image processing unit 155 is provided for detecting a reflector position of a reflector of the reflecting target in the region of interest defined in the second image. For example, brightness values of pixels in the second image may be determined and a pixel or region consisting of a plurality of pixels with the highest brightness level of light in the second wavelength range in the second image may be identified as the reflector position of the reflector of the reflecting target.

With the above disclosed embodiment of the invention it becomes possible to detect a reflective marker in the field with improved robustness even under unfavourable environmental conditions. More precisely, by first detecting the position of the reflecting target in the first image, being for example a visual image, and defining a region of interest in the second image, for example the infrared image, based on the detection of the target, the operations for detection of the reflector of the reflective target can be confined to the region of interest, thus reducing the risk of false detections of reflectors in the infrared image. Moreover, the invention allows a reduction in processing time needed to identify a reflective target in the scene by reducing the searched parts of the infrared image.

According to embodiments, the optical surveying instrument 100 may be a portable unit that can be deployed in the field using a tripod or any other positioning equipment. The instrument may be operated by mechanical means, such as to adjust the orientation of the surveying instrument, and by electronic means that may form an integral part of the surveying instrument or may be provided external thereto and wirelessly communicate with the surveying instrument.

The optical arrangement 110 is provided for assisting a user to aim at the target provided in the field. For the purpose of obtaining the first and second images the optical arrangement 110 may include at least one lens or may include an arrangement of lenses to provide an image of a scene within the field of view defined by the optical arrangement. The optical arrangement may be a telescope unit with an adjustable zoom and/or focus to assist orienting the surveying instrument toward the reflective target and to obtain the first and second image. While the optical arrangement may provide the images of the scene in the first and second wavelength ranges to the first and second image sensors 130 and 140, the first and/or a second image sensor may also use a separate optical arrangement that may be arranged in parallel to the optical arrangement 110.

The first image sensor 130 is an image sensor to obtain an image in a first wavelength range that may be a visible wavelength range, visible to a human eye. The imaging sensor 130 may for example be a CMOS, charged coupled device, type image sensor or any other type of image sensor. Preferably, the first image sensor 130 will consist of a plurality of pixels arranged on a rectangular surface of the image sensor. The first image sensor may be specifically adapted to be sensitive to light in the first wavelength range, for example the visible wavelength range, or may be equipped with filters to only let light pass within the first wavelength range.

Likewise, the second imaging sensor 140 is for obtaining in the second wavelength range a second image of the field of view and may for example be a CMOS, charged coupled device, type image sensor or any other type of image sensor. Preferably, the second image sensor 140 consists of a plurality of pixels arranged on a rectangular surface of the sensor. The sensor may be specifically adapted to be sensitive to light in the second wavelength range, for example the infrared wavelength range, or may be equipped with filters to only let light pass within the second wavelength range. According to alternative embodiments the first and second image sensors may be realised by a single image sensor sequentially taking images of the scene in the field of view in the first wavelength range and the second wavelength range, supported by corresponding filters that may be switched into the light path and by correspondingly controlling operation of the light emitter 120 to emit light in the second wavelength range and instances where the single image sensor picks up the image in the second wavelength range.

The surveying instrument is provided with a light emitter 120 emit light in the second wavelength range towards the field of view, to illuminate a scene including the reflective target. For example, the light emitter is a light emitter for emitting light in the infrared wavelength range using LEDs arranged in a ring type fashion concentric with the optical arrangement 110 of the instrument. Alternatively, the light emitter 120 may be arranged at another position of the surveying instrument 100, or may even be provided external thereto, for example as a handheld light emitter. The light emitter 120 preferably emits light in the second wavelength range with an intensity allowing the reflections from objects in the scene within the field of view to pass through the optical arrangement 110 towards the second image sensor 140. As noted, infrared light may be suitable for this purpose, but light in other wavelength ranges may be employed, such as in the ultra violet range or within the visible spectrum. The light emitter 120 may continuously illuminate the scene or may intermittently illuminate the scene and instances where the second image sensor picks an image.

According to an embodiment the optical surveying instrument includes a processing unit 150 that may be a general purpose processing unit running software to realise the functionality of the first image processing unit and the second image processing unit. Alternatively, the processing unit may include dedicated hardware adapted to realise the functionality of the first and second image processing units. The processing unit 150 may form an integral part of the surveying instrument or may at least partially be provided external thereto, using communication means to communicate with the surveying equipment, including wireless communication means.

The first image processing unit 151 is provided for identifying a target position of a reflecting target in the first image by detecting a known image pattern of the reflecting target in the first image. As noted, the functionality of the first image processing unit may be realised at least partially in software and/or hardware. For the detection of the known image pattern of the reflecting target in the first image the image of the first image sensor 130 is processed. For example, the individual pixel values of the first image may include at least one of brightness, colour values and hue.

Figure 2:
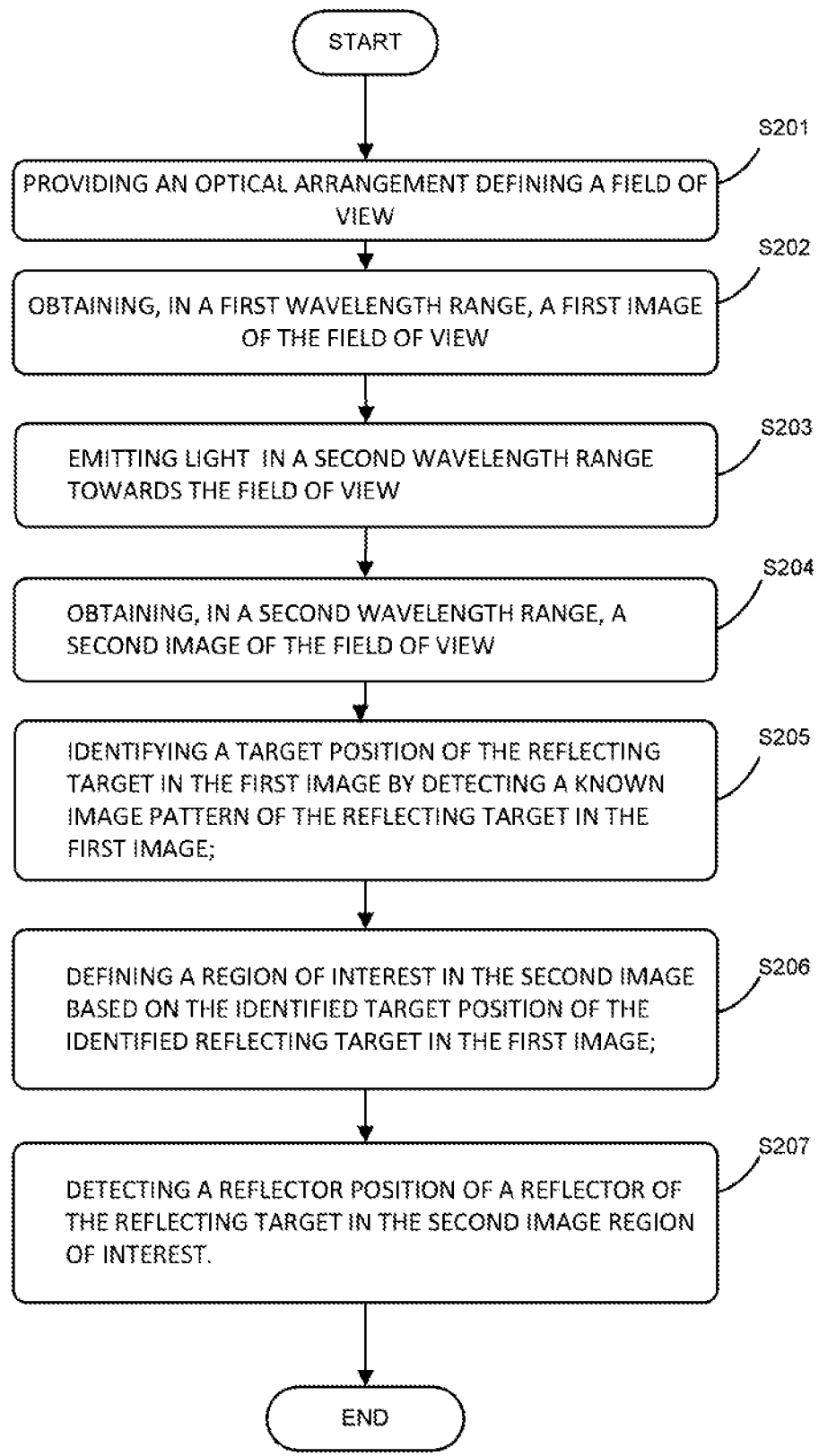
FIG. 2 illustrates operations for detecting a reflective target according to an embodiment of the invention.

The first image may be processed by the first image processing unit using a suitably trained neural network and/or other image processing technology. According to an embodiment, the reflecting target includes a target body and detecting the known image pattern in the first image includes processing the first image using the neural network to identify the target body. For example, the neural network may be trained to recognise a distinctive shape of the target body, such as a cube, a cylinder, sphere and similar as well as combinations thereof represented in the first image. Moreover, the neural network may be trained to recognise a distinctive colour or colour pattern provided on the surface of the reflective target and/or target body. For example, the target body may be provided with differently coloured squares. In another example the neural network is trained by placing the reflective target to numerous locations within a scene and by specifying to the neural network the respective positions of the reflective target in the first image. Another embodiment of the invention will now be described with respect to FIG. 2. FIG. 2 discloses an embodiment of a method for operating a surveying instrument, such as the optical surveying instrument as shown in FIG. 1. However, FIG. 2 is not limited thereto.

In a first operation S201 an optical arrangement defining a field of view is provided. The optical arrangement may be the optical arrangement of the surveying instrument of FIG. 1. For example, the optical surveying instrument may be deployed on a site to be surveilled, for example using a tripod. The optical arrangement of the instrument may then be aimed at a scene of interest, such as a scene in which a reflecting target is positioned. In an example the optical surveying instrument may be deployed on a construction site and may be operated to identify a reflector attached to a reflecting target, the reflecting target being deployed for designating a desired position on the construction site, for example for marking the path of a road under construction or a wall or other structure of a building under construction.

In an operation S202 a first image of the field of view defined by the optical arrangement is obtained in a first wavelength range, such as by the first image sensor 130 of FIG. 1. For this purpose the optical surveying instrument may be suitably arranged and oriented such that the viewed scene in the field of view defined by the optical arrangement can be expected to include the reflecting target. An operator of the optical serving instrument may then trigger the capturing of the first image, or the capturing of the first image of the field of view may be automatically triggered.

In operation S203 light in a second wavelength range is emitted towards the field of view. The light in the second wavelength range may be infrared light, however, any other wavelength range may be used. The light of the second wavelength range may be emitted for example by the light emitter 120 shown in FIG. 1. The light emission may be continuously or at instances in time at which the second image sensor is used to obtain the second image of the scene, the second image showing the reflections of the emitted light in the second wavelength range.

In operation S204 a second image of the field of view is obtained in the second wavelength range. Preferably, the first and second images are both taken through the optical arrangement such as the optical arrangement of FIG. 1. However, it is also conceivable to use different optical arrangements for providing the first and second images. Moreover, the first and second images may be obtained by using two different image sensors, sensitive to the light in the first wavelength range and the second wavelength range, respectively. Alternatively, a single image sensor can be employed sensitive to the first and the second wavelength range. In this case, when obtaining the image in the second wavelength range a suitable filter may be switched into the path of light to filter out light in the first wavelength range. Likewise, when obtaining the first image, a filter could be switched into the path of light to filter out light in the second wavelength range. In another example, a timer can be used to trigger both the emission of the light in the second wavelength range and the taking of the second image at given intervals.

In an operation S205 a target position of the reflecting target is identified in the first image by detecting a known image pattern generated by the reflecting target in the first image, such as a shape, texture, colour of the target in the first image.

In an operation S206 a region of interest is defined in the second image based on the identified target position of the identified reflecting target in the first image. For this purpose a position corresponding to the identified target position in the first image may be determined in the second image such as by identifying the coordinates in the second image corresponding to the coordinates of the target position in the first image.

In operation S207 a reflector position of a reflector of the reflecting target is detected in the second image in the region of interest, such as by determining a location of a maximum intensity of light in the second image.

Even though the operations S201-S206 of FIG. 2 are shown in a specific operational sequence, the invention is not limited thereto. Other sequences of the operations are conceivable, for example obtaining the first and second images may be interchanged.

In another embodiment, once the reflector position is detected, for example in operation S207 of FIG. 2, the reflector may be tracked. The optical surveying instrument with the optical arrangement that may include at least one lens defines a viewing axis. The viewing axis may be considered an imaginary line passing through substantially the centre of the optical arrangement and the field of view defined by the optical arrangement. Accordingly, the viewing axis also passes through a defined position of the first and/or second image sensor. Normally, the position where the viewing axis passes through the image sensor is substantially a centre position of the image sensor but may be any other defined position on the image sensor.

The tracking of the reflecting target may now include orienting the optical arrangement, preferably together with the optical surveying instrument, towards the reflecting target such that the position of the reflecting target in the second image and thus on the second image sensor comes to lie on the defined position where the viewing axis passes through the second image sensor and/or second image. This adjustment of the orientation of the optical arrangement may be performed by detecting a positional deviation between the reflecting target as represented in the second image relative to the viewing axis, that is the position where the viewing axis passes through the second image. This positional deviation may correspond to a number of pixels in the two spatial directions of a rectangular second image sensor. Further, the adjustment of the orientation may then be performed by orienting the viewing axis towards the reflecting target by executing a rotation of the optical arrangement to compensate for the positional deviation. For example, the positional deviation could be quantified in a sequence of second images, to iteratively decrease the positional deviation, eventually to 0.

The tracking process is completed, if the positional deviation of the position of the reflecting target in the second image and the position were the viewing axis passes through the second image is zero and thus the reflecting target comes to lie on the viewing axis.

If the positional deviation thereafter becomes different from zero, for example if the reflecting target moves, the tracking process can be restarted in so that a moving reflecting target is tracked by the optical surveying instrument by keeping the positional deviation between the reflecting target and the viewing axis small, preferably zero.

The tracking operations may be executed by a tracking unit for determining the positional deviation of the reflecting target in the second image relative to the viewing axis and orienting the viewing axis towards the reflecting target by executing a rotation of the optical arrangement to compensate for the positional deviation. Moreover, such tracking unit may be adapted to determine a positional deviation of the reflecting target relative to the viewing axis and a sequence of second images and to Orient the viewing access to the reflecting target to compensate for the positional deviation for each of the sequence of second images.

A further embodiment of the invention will now be described with respect to FIG. 3.

Figure 3A:
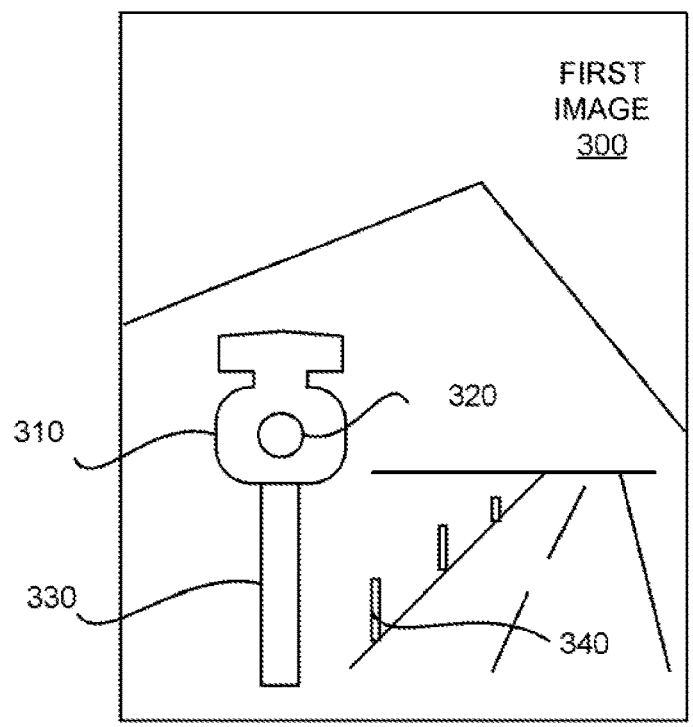
FIG. 3A illustrates a first image obtained by the optical surveying instrument in accordance with an embodiment of the invention.
Figure 3B:
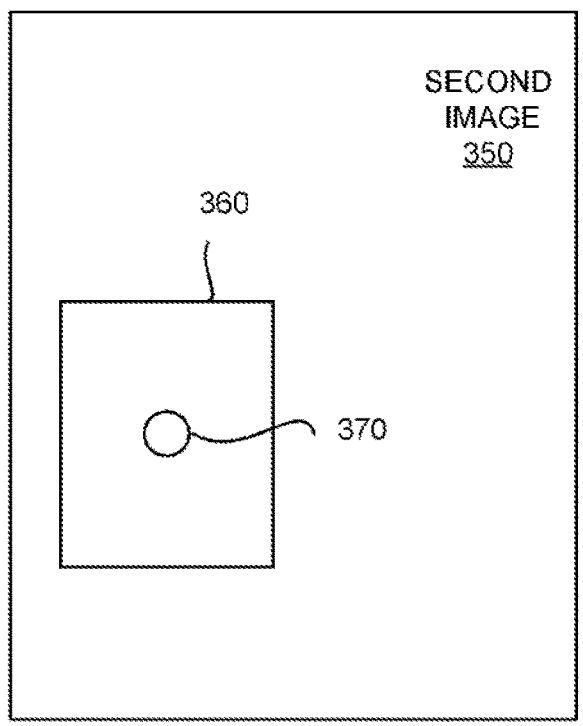
FIG. 3B illustrates a second image obtained by the optical surveying instrument in accordance with an embodiment of the invention.

FIGS. 3A and 3B illustrate examples of a first image and of a second image of a scene captured in the field of view of the optical arrangement according to embodiments of the invention.

FIG. 3A illustrates an exemplary first image 300; 800 of a scene captured in the field of view defined by the optical arrangement, such as the optical arrangement of FIG. 1.

The first image 300; 800 illustrated in FIG. 3A includes a reflecting target 310 provided with a reflector 320. In the example, the reflecting target is mounted on a support 330. Moreover, the first image 300; 800 schematically illustrates a road with reflecting roadside posts 340 on the left side of the road.

In operation the optical surveying instrument obtains the first image of the field of view, that is the image 300; 800. A first image processing unit such as unit 151 of FIG. 1 identifies a target position of the reflecting target 310 in the first image 300; 800 by detecting the known image pattern of the reflecting target. For example, a neural network can be trained to detect the rounded base portion of the reflecting target in combination with the flat top shape of the reflecting target. The distinctive shape of the reflecting target improves the robustness of the detection process, as natural objects or artificial objects are unlikely to have a similar shape as the reflecting target 310.

In the detection process the neural network may make use of further information on objects present in the field of view, such as of the elongated support 330 supporting the reflecting target. For example, if the neural network cannot with high likelihood identify the reflecting target 310 in the first image, the detected position can be confirmed, if an object such as the elongated base portion 330 is detected in another detection process targeting element gated objects in close vicinity to the potential location of the reflecting target 310. Details of the detection process will be disclosed further below.

Since the detection process targets the distinctive shape of the reflecting target 310 with a rounded base portion and a flat top portion, other reflectors such as the roadside posts 340 are not detected as high likelihood candidates of the reflecting target.

Advantageously, the reflecting target has a rotational body, that is a body that generates a similar shape in an image if viewed from different viewing angles. A detection of the reflecting target in the first image may be improved by first obtaining an estimation of a distance between the reflecting target and the optical surveying instrument and an estimation of a corresponding size of the target the body expected in the first image.

Preferably, the detection process targets the reflecting target 310 and does not specifically aim at identifying the reflector 320 attached to the reflecting target body for reduced processing requirements. The detection result of the reflecting target 310 in the first image 300; 800 is rather used to guide the further detection process of the reflector attached to the reflecting target in the second image.

FIG. 3B illustrates an example of a second image 350; 850 of a scene in the field of view of the optical arrangement of the optical surveying instrument according to an embodiment of the invention.

The second image 350; 850 illustrates a region of interest 360 defined in the second image based on the identified target position in the first image 300; 800 and illustrates a reflector 370 of the reflecting target 310 of the first image 300; 800.

In the detection process, once the reflecting target 310 including the reflector 320 is detected in the first image, the region of interest 360 in the second image 350; 850 is defined based on the target position in the first image. For example, a rectangular region of interest or of any other shape can be defined in the second image with the position of the reflecting target at its centre. The position of the reflecting target in the second image can be determined by transferring the determined position of the reflecting target in the first image to the second image. If the first and second image represent the same scene, the position of the reflecting target 310 detected in the first image can be directly transferred to a corresponding location of the detector in the second image and the region of interest can be defined in the second image based on this transferred position of the reflecting target. If the pixel sizes of the first and second image are identical, the image positions of the reflecting target in the first image and the second image based on pixel coordinates also are identical. If the pixel sizes, i.e. the resolution, of the first and second image deviate from one another, the pixel coordinates of the reflecting target in the first image need to be appropriately scaled and transferred to the second image to identify the corresponding position of the reflecting target in the second image. If the depicted scenes in the first image and the second image deviate by a known offset, a further adaptation of the pixel coordinates needs to be performed to compensate for the offset.

While the region of interest 360 may be defined with a fixed size in the second image 350; 850, it is also conceivable to define the region of interest in the second image based on a confidence level, described later, of the detection process of the reflecting target in the first image. If the confidence level remains below a predetermined threshold, the region of interest in the second image may be defined as the entire image so that the search is performed in the entire second image.

Once the region of interest is defined in the second image, the reflector position of the reflector of the reflecting target can be detected in the region of interest in the second image. For example, a region of highest intensity of light in the second wavelength range in the second image may be detected as the position of the reflector of the reflecting target.

To improve the detection process of the reflector and the second image, the second image may be obtained as a difference image of two images, a first one of the two images being obtained while emitting light in the second wavelength range towards the field of view and a second one of the two images being obtained without emitting light in the second wavelength range. Subsequently, the two images with and without emission of light in the second wavelength range may be subtracted from one another in order to obtain a difference image only representing areas of high ref activity of light of the second wavelength range in the second image. A detection of a position of highest intensity of light in the second wavelength range in the second image can thus be facilitated. For example, pixel clusters of contiguous pixels of high intensity may be detected and a centre pixel position in the detected pixel cluster may be defined as the reflector position in the second image.

Figure 4:
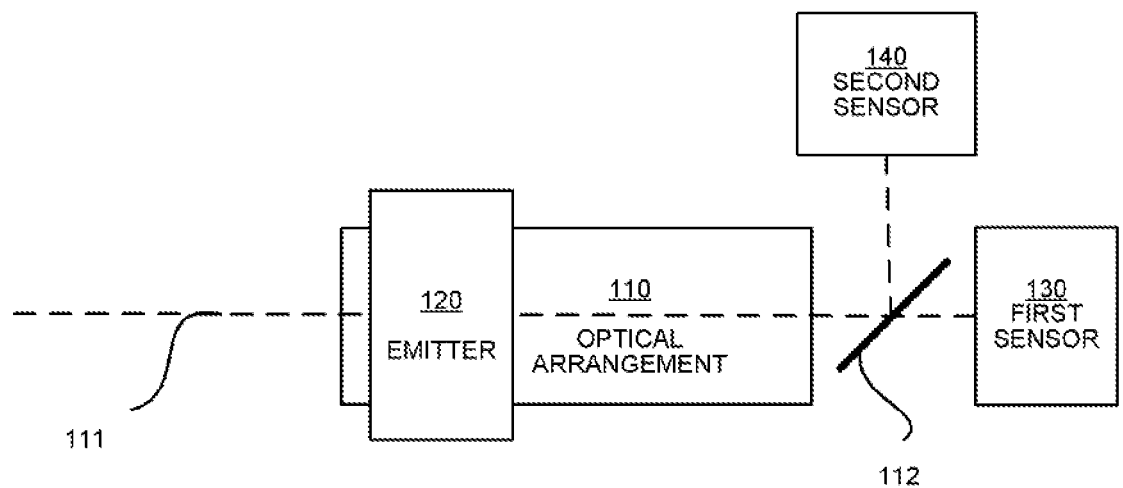
FIG. 4 illustrates elements of the optical surveying instrument in accordance with an embodiment of the invention.

A further embodiment of the invention is described with respect to FIG. 4.

FIG. 4 illustrates an optical arrangement 110 such as the optical arrangement of FIG. 1. Moreover, FIG. 4 illustrates an emitter 120 of light in the second wavelength range towards a scene captured in the field of view of the optical arrangement. Moreover, FIG. 4 illustrates a viewing direction 111 defined by the optical arrangement. For example, the viewing direction is a virtual direction that passes through the centre of the optical arrangement and through the centre of the field of view defined by the optical arrangement.

Moreover, FIG. 4 illustrates a first sensor 130 for detecting light in the first wavelength range and a second sensor 140 for detecting light in the second wavelength range.

A half-mirror 112 is provided in the path of the light passing through the optical arrangement and is preferably centred on the viewing direction as illustrated. The mirror 112 reflects part of the light passing through the optical arrangement towards the second sensor 140, while part of the light passing through the optical arrangement passes through the mirror 112 onto the first image sensor 130. The first and second image sensors and the mirror 112 may preferably be arranged and calibrated such that the first and second image sensors capture identical scenes in the field of view of the optical arrangement. Identical scenes are captured if the position of objects represented in the first image and in the second image correspond to one another.

If the first and second image sensors and/or the half-mirror 112 are misaligned, a digital alignment may be performed by correlating images obtained by the first image sensor and the second image sensor with one another to quantify a deviation or offset therebetween. Based on the offset, matching image sections in the images provided by the first and second sensors may be selected as the first and second images.

The arrangement of elements of the optical surveying instrument shown in FIG. 4 constitute an example only, other arrangements of the elements are conceivable, for example the positions of the first and second sensor may be exchanged. Further, according to other embodiments parallel optical arrangements may be provided for the first image sensor and for the second image sensor, eliminating the need for a half-mirror 112.

Still further, in other embodiments the first image sensor and the second image sensor may be realised on a single sensing element. In this case a movable filter may be used to obtain the image in the first wavelength range and the image in the second wavelength range by switching the movable filter or multiple movable filters into the path of the light passing through the optical arrangement towards the single image sensor.

Figure 5:
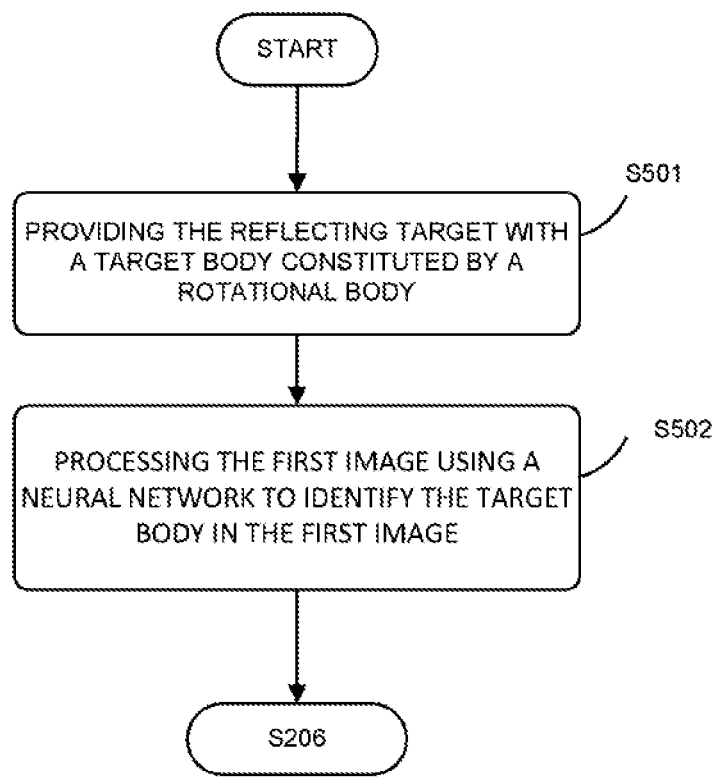
FIG. 5 illustrates operations for improving the detection of a reflective target in a visual image by the design of the target body of the reflective target according to an embodiment of the invention.

Subsequently an embodiment of the invention will be described with respect to FIG. 5. FIG. 5 illustrates operations for identifying a position of the reflector of the reflecting target according to an embodiment of the invention.

In an operation S501 the reflecting target with a target body constituted by a rotational body is provided in the field so that it is represented in a scene captured within the field of view of the optical arrangement of the surveying instrument substantially independent of the viewing direction.

According to the embodiment of FIG. 5 the reflective target has a target body that is a rotational body. Recognition of the target body by the neural network in the first image can thus be facilitated, as a shape representation of the target body in the first image does not or at least is less dependent on a viewing angle. If the target body is a rotational body, projections of the target body in two dimensions, such as in the two-dimensional first image captured by the first image sensor, show a smaller dependency on an angle at which the target body is imaged as compared to other shapes of the target body. A rotational body of the target can be created by letting an arbitrary shape rotate around a rotation axis to define the outer the limitation of the target body. Preferably, the reflecting target is a rotational body so that its projection from different horizontal viewing directions in the first image is substantially the same.

Moreover, the target body may have a shape that is less likely to appear otherwise in a normal working environment.

In one example the target body may be a combination of a sphere and a cylinder. For example, the body of the reflecting target may have the shape of an anvil.

In an operation S502 the first image is processed using a neural network to identify the reflecting target or rather its target body in the first image. The neural network may be any neural network trainable to detect predetermined objects in an image scene. For example, in a training process the neural network may be presented with image scenes in which the reflecting target is present at predefined positions, viewed from different angles and under different lighting and other environmental conditions. Based on the known positions the network can be trained to correspondingly identify the position of the reflecting target in image scenes were the position of the reflecting target is not known. As a neural network a convolutional neural network may be employed.

The detection process of the reflecting target in the first image by using the neural network may be improved by obtaining an estimation of a distance between the reflecting target and the optical surveying instrument and by an estimation of a corresponding size of the target body as represented in the first image. For example, a user of the optical surveying instrument may specify an approximate distance to the reflecting target in the scene by making a corresponding input. Based on the user input of the approximate distance to the reflecting target and the then known size of the target body, the expected size of the reflecting target in the first image may be estimated and the neural network may be correspondingly trained to target structures of the expected size of the reflecting target in the recognition process based on the distances. Alternatively or in addition thereto the electronic distance measurement unit may be used for determining the distance to potential reflecting targets as a basis for the estimation of the target size.

Following operation S502 the flow of operations may continue with for example operation S206 of FIG. 2.

Figure 6:
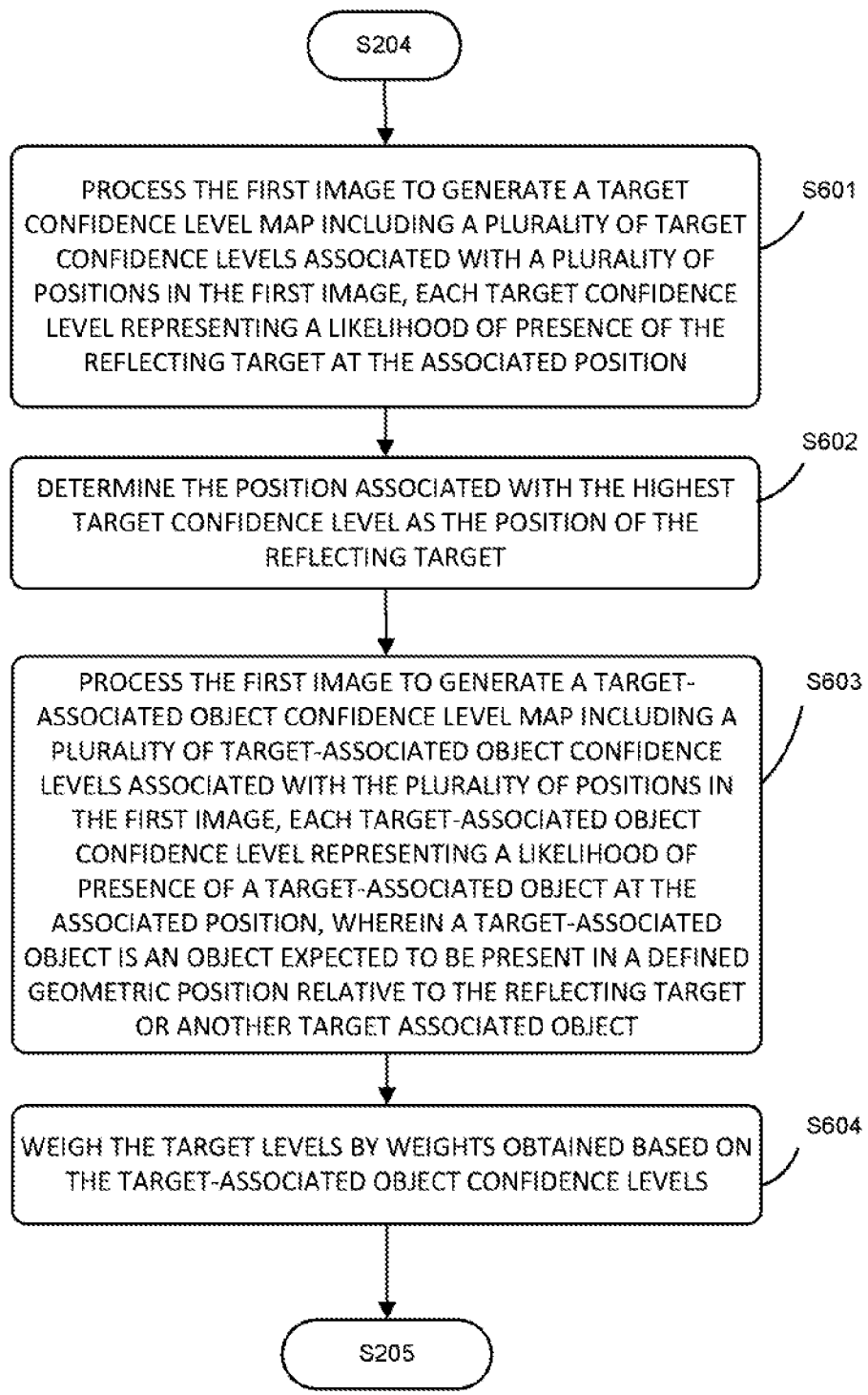
FIG. 6 illustrates operations for improving the detection of a reflective target in a visual image by using positive and negative identification of target candidates according to an embodiment of the invention.

In the following a further embodiment of the invention will be described with respect to FIG. 6. FIG. 6 illustrates an embodiment of a flow of operations for detecting the reflecting target using a neural network.

According to the embodiment of FIG. 6, the flow of operations may continue from operation S204 of FIG. 2 or another operation. According to FIG. 6, in an operation S601, the first image processing unit of the optical surveying instrument is configured to process the first image to generate a target confidence level map including a plurality of target confidence levels associated with a plurality of positions in the first image, wherein each target confidence level represents a likelihood of presence of the reflecting target at the associated position. In an operation S602 the position associated with the highest target confidence level determined by the neural network is designated to constitute the position of the reflecting target.

The target associated confidence level map may include target associated confidence levels at a plurality of positions in the first image, for example regularly arranged in a grid overlay on the first image, indicating the likelihood in the detection process using the neural network that the reflecting target is located at the respective positions or in the vicinity thereof. For example, the likelihoods may be values between 0 and 1, with likelihoods gradually closer to 1 indicating a gradually higher likelihood of presence of the reflecting target at the associated position. In turn, likelihood values gradually diminishing towards 0 may indicate a gradually lower probability of presence of the reflecting target at the associated position. The likelihoods may be the direct output of the processing operations on the first image using the neural network. Alternatively, a normalization process may be used to normalise outputs of the neural network to values between and including 0 and 1.

With the confidence level map the neural network associates with each of a plurality of positions in the first image a likelihood of presence of the reflecting target at this position or in the vicinity thereof, depending on the grid spacing. The position with the highest likelihood then indicates the position of the reflecting target.

Moreover, in an operation S603 the first image is process to generate a target associated object confidence level map including a plurality of target associated object confidence levels associated with the plurality of positions in the first image, each target associated object confidence level representing a likelihood of presence of a target associated object at the associated position, wherein a target associated object is an object expected to be present in a defined geometric position relative to the reflecting target for another target associated object.

A target associated object may for example be an object that is generally used in a defined geometric position relative to the reflecting target, for example in close proximity to the reflecting target, which may for example be the elongated base 330 of FIG. 3A supporting the reflecting target. A target associated confidence level map may be generated for the target associated object, the target associated confidence level map indicating a likelihood of presence of the target associated object at the corresponding position or in the vicinity thereof. Similar to the case of training the neural network based on the reflecting target using images in which the reflecting target is the present, the neural network may be trained to recognise one or a plurality of target associated objects, i.e. objects that are known to appear in association with the reflecting target.

Accordingly, if a high target associated confidence level is detected at a position in close proximity or in a defined geometric arrangement to a position with a high target confidence level for the reflecting target, presence of the reflecting target at this position is more likely.

For example, in an operation S604 the target confidence levels are weighed using weights obtained based on the target associated object confidence levels at each position.

By way of this process the target associated confidence levels of the target confidence level map may be modified based on the target associated confidence levels of the target associated confidence level map. The modification may for example include adding weight corresponding to the target associated object confidence levels to the target confidence levels or may include adding an increment obtained based on the target associated confidence levels. The increment may be the weighted target associated object confidence level. The modification may also include a multiplication of the target associated confidence levels with a value obtained on the basis of the target associated confidence levels. If the confidence levels are normalised between and including 0 and 1, the target confidence level may be incremented by the target associated confidence levels or multiplied by the target associated confidence levels plus 1.

As noted, the defined geometric position may be a proximity of the target associated object to the reflecting target, or any other defined positional relation. For example, the geometric position may also be the presence of a target associated object in a defined direction and/or proximity from the reflecting target, such as a supporting base 330 as shown in FIG. 3A underneath the reflecting target.

Further to a single target associated object, geometric positional relations between multiple target associated objects and the reflecting target may be employed. For example, the target associated confidence levels may be weighed based on the presence of multiple objects that are expected in a defined positional relation to the reflecting target in the first image, such as one object in close proximity and another object in a defined direction from the reflecting target. In this case confidence level maps may be generated for each of the target associated objects and the target associated confidence levels are weighed based on the confidence levels of the multiple target associated objects at locations in the defined positional relation thereto.

In addition thereto or alternatively, a positional relation between multiple target associated objects themselves may be employed to correspondingly weigh or increment the target confidence levels. For example, if two target associated objects such as a supporting pole and a human operator holding the reflecting target or a vehicle on which the reflecting target is mounted are detected in the first image in a predefined positional relation to one another, the likelihood of presence of the reflecting target and an associate position is increased and the target confidence levels can be correspondingly modified or weighed.

Thereafter the flow of operations may continue with operation S205 of FIG. 2 or may proceed differently.

It is noted that the operations of FIG. 6 are partially optional, for example in embodiments only operations S601 and S602 may be used. Operations S603 and S604 may be optionally performed.

Figure 7:
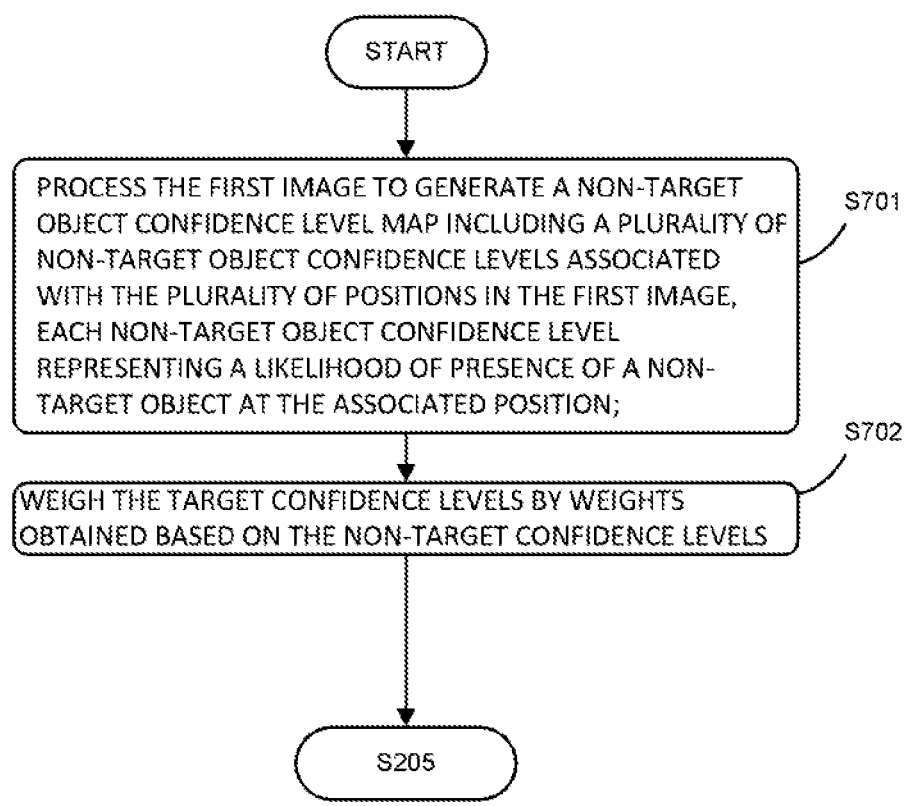
FIG. 7 illustrates operations for improving the detection of a reflective target in a difference image according to an embodiment of the invention.

A further embodiment of the invention will now be described with respect to FIG. 7. FIG. 7 illustrates operations of a method for further improving the target confidence levels based on the presence of non-target objects.

A non-target object may be an object that has a shape that is similar to the shape of the reflecting target and that may thus be misidentified as the reflecting target. For example, a non-target object may be an object that is commonly used in the environment under which the optical surveying instrument is employed and thus may be present in the imaged scene. For example, a natural object or a manmade object such as a protective helmet may be misidentified as the reflecting target. A non-target object may also be an object, which usually distracts the detection in the image in the second wavelength range, such as an IR tracker, like a warning vest, car headlights etc.

For example, if at a certain position the presence of the reflecting target is determined with a certain likelihood, as reflected in the target confidence level map, the detection result can be improved if at the same time the likelihood of presence of objects that are known objects different from the reflecting target is considered. Similar to the case of training the neural network to recognise the reflecting target or target associated objects, the neural network may be trained to recognise known objects that are different from the reflecting target but may have a shape that is similar to the one of the reflecting target. Accordingly, if the neural network recognises a reflecting target at a certain position, the recognition may be a false recognition of a non-target object. In order to reduce the risk of a misconception of a non-target object as the reflecting target, the reflecting target confidence levels may be weighed by weights obtained based on the non-target confidence levels, such as by deducting the non-target confidence level from the target confidence level or by multiplying the target confidence level by a weight obtained based on the non-target confidence level, such as a weight obtained by one minus the non-target confidence level.

In a corresponding operation S701 the first image is processed to generate a non-target object confidence level map including a plurality of non-target object confidence levels associated with the plurality of positions in the first image, each non-target object confidence level representing a likelihood of presence of a non-target object at the associated position.

Subsequently, in operation S702 the target confidence levels may be weighed by weights obtained based on the non-target confidence levels. For example, in operation 702 the non-target object confidence levels of a non-target object or a plurality of non-target objects, or the confidence levels multiplied by a predetermined factor may be deducted from the target confidence levels so that in the case of a certain likelihood of presence of a non-target object at a position where with a certain likelihood presence of the reflecting target is detected, the likelihood of presence of the reflecting target at the corresponding position is correspondingly reduced.

After operation S702 the flow of operations may continue for example with operation S205 of FIG. 2.

Figure 8A:
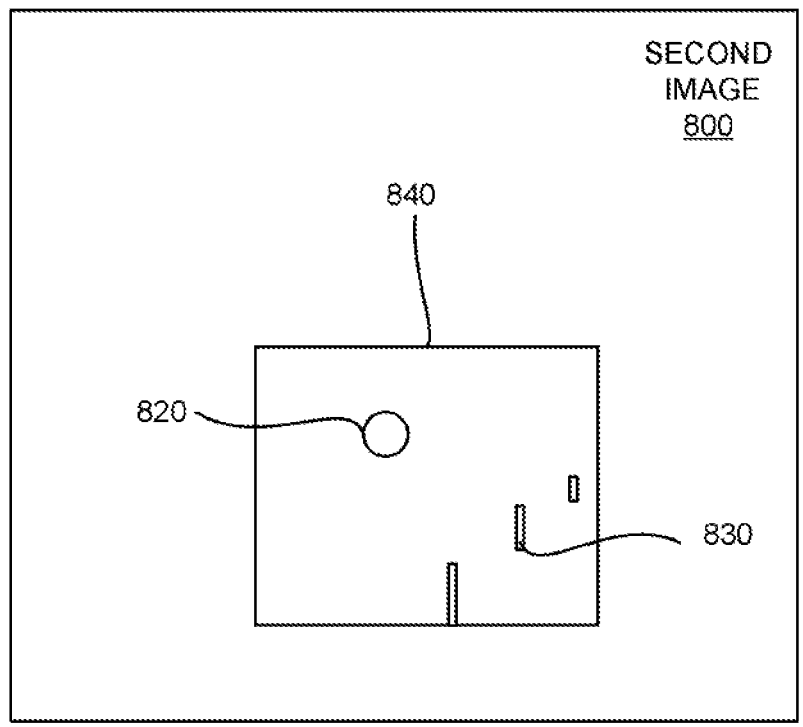
FIGS. 8A and 8B illustrates examples of a second image and a visual image for improving the detection of a reflective target by reducing a search space in the visual image according to an embodiment of the invention.
Figure 8B:
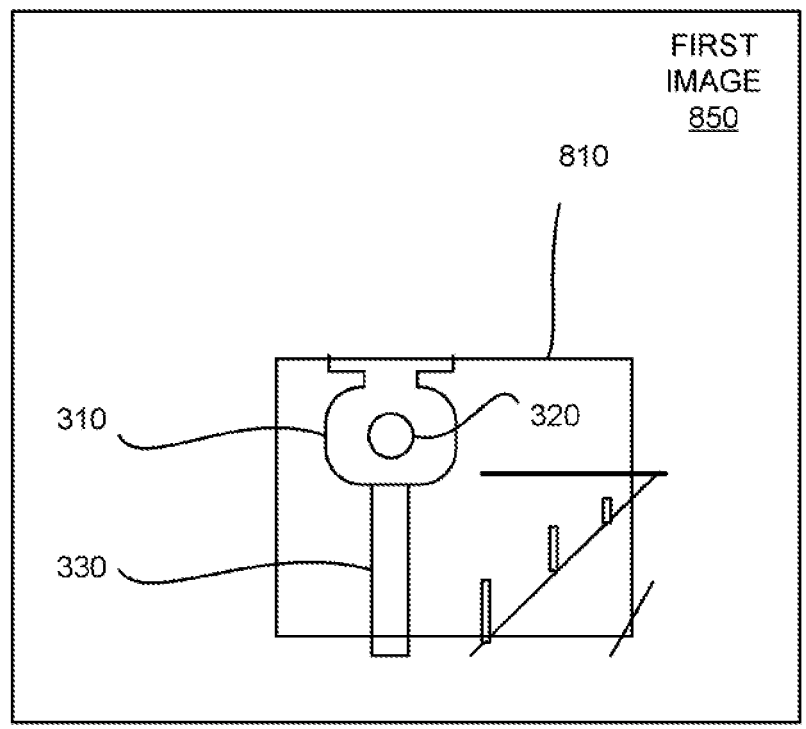

A further embodiment of the invention will now be described with respect to FIGS. 8A and 8B. FIGS. 8A and 8B illustrate an embodiment of the invention by which a region of interest for performing the search for the reflecting target in the first image may be defined based on high intensity levels of light in the second wavelength range identified in the second image.

FIG. 8A illustrates an example of the second image 800 in the second wavelength range, including areas of high intensity caused by strong reflections of light in the second wavelength range, as denoted by reference numerals 820 and 830. For example, areas 820 and 830 correspond to areas of the second image with an intensity level above a predefined intensity threshold. Reference numeral 820 may indicate for example the reflection of the reflector of the reflecting target and reference numeral 830 may for example indicate an area of high intensity caused by reflecting roadside posts such as shown in FIG. 3. Moreover, in FIG. 8A a region 840 may be defined that encloses the regions of high intensity 820 and 830. Region 840 may be defined as a rectangle or any other shape. For example, the region 840 of FIG. 8A may be defined as a region that encloses all areas with an intensity level above a certain threshold.

In the example of FIG. 8A a single region 840 is defined to enclose the areas of high intensity 820 and 830, however, it is conceivable to also define multiple such regions, for example if the second image shows a larger number of regions of high intensity.

FIG. 8B illustrates an example of the first image 850 in which a region of interest 810 is defined that corresponds to region 840. For defining the region of interest 810 the region 840 may be transferred to the first image 850 as for example correspondingly described with reference to FIGS. 2 and 3.

The subsequent operations for performing the search for the reflecting target using pattern recognition may now be performed limited to the region of interest 810 defined in the first image.

In operation, the optical surveying instrument has a processing unit or is in communication therewith, such as the second image processing unit described with respect to the preceding embodiments, adapted to detect the sections of the second image with a brightness or intensity level above a predetermined threshold and to define in the first image a first image region of interest including the detected sections, such as at locations corresponding to the location of the sections in the second image. Moreover, the optical surveying instrument may include a processing unit such as the first processing unit described with respect preceding embodiments adapted to detect the known image pattern of the reflecting target in the corresponding region of interest in the first image.

Reducing the search for the reflecting target in the first image to the region of interest allows to correspondingly reduce processing requirements.

According to another embodiment of the invention the optical surveying instrument may not only be tracking a single reflecting target but may be employed to track simultaneously multiple reflecting targets. In this case the first image processing unit such as described with respect to the preceding embodiments is adapted to identify a second or multiple further reflecting targets in the first wavelength range and to define a second or multiple such regions of interest containing the identified second or multiple reflecting targets. The remaining processing operations may be as disclosed with respect to the preceding embodiments, separately handling the different regions of interest.

While the invention has been described with respect to various embodiments in connection with the drawings, it is understood that the individual embodiments may be combined.

The invention claimed is:

1. Optical surveying instrument, comprising:
   an optical arrangement defining a field of view and a viewing axis;
   a first image sensor configured to obtain, using light in a first wavelength range, a first image of the field of view;
   a light emitter configured to emit light in a second wavelength range towards the field of view;
   a second image sensor configured to obtain, using light in the second wavelength range, a second image of the field of view;
   a first image processing unit configured to identify a target position of a reflecting target in the first image by detecting a known image pattern of the reflecting target in the first image, wherein the reflecting target includes a rotational body, and detecting the known image pattern in the first image includes processing the first image using a neural network to identify the rotational body; and
   a second image processing unit configured to:
   define a region of interest in the second image based on the identified target position in the first image; and
   detect a reflector position of a reflector of the reflecting target in the region of interest;
   a tracking unit configured to:
   determine a positional deviation of the reflecting target in the second image relative to the viewing axis, wherein the viewing axis passes through a defined position of the second image; and
   orient the viewing axis towards the reflecting target by executing a rotation of the optical arrangement to compensate for the positional deviation.

2. Optical surveying instrument according to claim 1, wherein the first image processing unit is configured to obtain an estimation of a distance between the reflecting target and the optical surveying instrument and to estimate a corresponding size of the rotational body in the first image.

3. Optical surveying instrument according to claim 1, wherein the first image processing unit is configured to
process the first image to generate a target confidence level map including a plurality of target confidence levels associated with a plurality of positions in the first image, each target confidence level representing a likelihood of presence of the reflecting target at the associated position; and
determine the position associated with a highest target confidence level as the position of the reflecting target.

4. Optical surveying instrument according to claim 3, wherein the first image processing unit is configured to
process the first image to generate a target-associated object confidence level map including a plurality of target-associated object confidence levels associated with the plurality of positions in the first image, each target-associated object confidence level representing a likelihood of presence of a target-associated object at the associated position, wherein a target-associated object is an object expected to be present in a defined geometric position relative to the reflecting target or another target associated object;
weigh the target confidence levels by weights obtained based on the target associated object confidence levels.

5. Optical surveying instrument according to claim 3, wherein the first image processing unit is configured to
process the first image to generate a non-target object confidence level map including a plurality of non-target object confidence levels associated with the plurality of positions in the first image, each non-target object confidence level representing a likelihood of presence of a non-target object at the associated position;
weigh the target confidence levels by weights obtained based on the non-target object confidence levels.

6. Optical surveying instrument according to claim 1, wherein the second image processing unit is adapted to
detect sections of the second image with a brightness level above a threshold; and
define, in the first image, a region of interest in the first image including the detected sections; and
the first image processing unit is adapted to detect the known image pattern of the reflecting target in the region of interest in the first image.

7. Optical surveying instrument according to claim 1, wherein the tracking unit is adapted to determine a positional deviation of the reflecting target relative to the viewing axis in a sequence of second images and to orient the viewing axis to the reflecting target to compensate for the positional deviation for each of the sequence of second images.

8. Optical surveying instrument according to claim 1, wherein the first image processing unit is adapted to identify a second reflecting target in the first image and to define a second region of interest containing the identified second reflecting target.

9. Method for optical surveillance including:
providing an optical arrangement defining a field of view and a viewing axis;
obtaining, in a first wavelength range, a first image of the field of view;
emitting light in a second wavelength range towards the field of view;
obtaining, in the second wavelength range, a second image of the field of view;
identifying a target position of a reflecting target in the first image by detecting a known image pattern of the reflecting target in the first image, wherein the reflecting target includes a rotational body, and detecting the known image pattern in the first image includes processing the first image using a neural network to identify the rotational body;
defining a region of interest in the second image based on the identified target position of the reflecting target in the first image; and
detecting, in the second image, a reflector position of a reflector of the reflecting target in the region of interest;
determining a positional deviation of the reflecting target in the second image relative to the viewing axis, wherein the viewing axis passes through a defined position of the second image; and
orienting the viewing axis towards the reflecting target by executing a rotation of the optical arrangement to compensate for the positional deviation.

10. The method of claim 9, wherein detecting the reflector position of the reflector of the reflecting target in the region of interest includes identifying brightness values of pixels.

11. Optical surveying instrument according to claim 1, wherein the second wavelength range is narrower than the first wavelength range, and at least a portion of the light in the first wavelength range is not used to obtain the second image.

12. Optical surveying instrument according to claim 1, wherein the optical arrangement includes a telescope with at least one lens.

13. Optical surveying instrument according to claim 1, wherein the light in the first wavelength range includes visible light.

14. Optical surveying instrument according to claim 1, wherein the light in the second wavelength range includes infrared light.

15. Optical surveying instrument according to claim 1, wherein the region of interest in the second image includes a first part of the second image surrounding the target position of the reflecting target.

* * * * *